(12) United States Patent
Song et al.

(10) Patent No.: US 7,492,749 B2
(45) Date of Patent: Feb. 17, 2009

(54) METHOD AND SYSTEM FOR PROVIDING MULTI-INPUT-MULTI-OUTPUT (MIMO) DOWNLINK TRANSMISSION

(75) Inventors: Jian Song, Germantown, MD (US); Khalid Karimullah, Olney, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 627 days.

(21) Appl. No.: 10/849,101

(22) Filed: May 19, 2004

(65) Prior Publication Data

US 2005/0259627 A1 Nov. 24, 2005

(51) Int. Cl.
*H04B 7/216* (2006.01)

(52) U.S. Cl. .................. 370/342; 370/208; 370/328; 370/337; 370/341; 370/347; 455/101; 455/132; 455/143; 455/450; 455/453; 342/383

(58) Field of Classification Search .............. 370/348, 370/347, 338, 328, 208, 341, 342; 455/450–453, 455/101, 132, 143; 342/383
See application file for complete search history.

(56) References Cited

U.S. PATENT DOCUMENTS

| | | | |
|---|---|---|---|
| 4,562,478 A | 12/1985 | Hirasawa et al. | |
| 4,652,932 A | 3/1987 | Miyajima et al. | |
| 5,023,931 A | 6/1991 | Streck et al. | |
| 5,321,514 A | 6/1994 | Cerritos et al. | |
| 5,351,270 A | 9/1994 | Graham et al. | |
| 5,557,320 A | 9/1996 | Krebs | |
| 5,568,205 A | 10/1996 | Hurwitz | |
| 5,633,891 A | 5/1997 | Rebec et al. | |
| 5,708,961 A | 1/1998 | Hylton et al. | |
| 5,729,549 A | 3/1998 | Kostreski et al. | |
| 5,734,589 A | 3/1998 | Kostreski et al. | |
| 5,812,930 A | 9/1998 | Zavrel | |
| 5,915,020 A | 6/1999 | Tilford et al. | |
| 5,991,599 A | 11/1999 | Uchikawa | |
| 6,687,492 B1* | 2/2004 | Sugar et al. | 455/276.1 |
| 6,745,009 B2* | 6/2004 | Raghothaman | 455/63.1 |
| 6,859,503 B2* | 2/2005 | Pautler et al. | 375/299 |
| 7,002,934 B2* | 2/2006 | Dolgonos et al. | 370/328 |
| 7,006,810 B1* | 2/2006 | Winters et al. | 455/277.1 |
| 7,120,395 B2* | 10/2006 | Tong et al. | 455/101 |
| 2002/0004391 A1* | 1/2002 | Austin | 455/427 |
| 2003/0185295 A1* | 10/2003 | Yousef | 375/233 |
| 2004/0062193 A1* | 4/2004 | Ma et al. | 370/208 |
| 2004/0178954 A1* | 9/2004 | Vook et al. | 342/383 |

* cited by examiner

*Primary Examiner*—Stephen M D'Agosta

(57) ABSTRACT

An approach is provided for supporting transmission in a multi-input-multi-output (MIMO) communication system including a plurality of terminals. A preamble portion of a frame is transmitted by a multiple transmit antennas of a hub using Orthogonal Frequency Division Multiplexing (OFDM) to the terminals over a channel, wherein each of the terminals determines a characteristic of the channel with respect to the transmit antennas as feedback information. The hub receives the feedback information from the terminals. The hub selects, according to the feedback information, a subset of the antennas for transmission of a remaining portion of the frame to the terminal.

20 Claims, 8 Drawing Sheets

METHOD AND SYSTEM FOR PROVIDING MULTI-INPUT-MULTI-OUTPUT (MIMO) DOWNLINK TRANSMISSION

FIELD OF THE INVENTION

The present invention relates to a communication system, and more particularly to a Multi-Input-Multi-Output (MIMO) system.

BACKGROUND OF THE INVENTION

Because of the advantages associated with mobility and ease of deployment, wireless communication systems have emerged as a viable alternative to terrestrial systems. However, because of the high bandwidth requirements of today's applications (e.g., broadband services, digital video broadcast, etc.) along with a continual demand for higher quality of service, the limitations of wireless systems are more pronounced. These shortcomings include limited distance, limited bandwidth, and signal fading, particularly in non-line-of-sight (NLOS) propagation conditions. Under NLOS conditions, severe fading and shadowing problems are present.

To address these concerns, the so-called Multi-Input-Multi-Output (MIMO) systems have emerged to combat fading by providing diversity as well as increased system throughput. For these MIMO systems, multiple transmit and receive antennas are used to support a multiplicity of independently faded paths between transmit to receive antennas, thereby making use of spatial diversity. Spatial diversity improves signal-to-noise ratio in the presence of random fading caused by multipath propagation by combining the outputs of decorrelated antennas.

Conventional MIMO systems target symmetric traffic (peer-to-peer) and moderate quality of service, and thus, are not well suited for wireless applications involving asymmetric communication. One such application is the distribution of audio/video signals within the home. Another drawback with conventional systems is that these systems require complex, costly receivers. The cost of receivers is particularly significant in multiple access systems, thereby hindering widespread deployment. Further, in the context of residential audio/video distribution, the receivers can be moved from room to room; this quasi-stationary environment introduces a challenge in optimizing the MIMO system in terms of diversity and efficient power distribution.

Therefore, there is a need for an approach that effectively supports high data rate, asymmetric wireless applications. There is also a need to utilize inexpensive components, particularly at the receivers.

SUMMARY OF THE INVENTION

These and other needs are addressed by the present invention, wherein an approach is provided for supporting transmission in a multi-input-multi-output (MIMO) communication system including a hub communicating with one or more terminals. An Orthogonal Frequency Division Multiplexing (OFDM) downlink preamble portion of a frame is transmitted to measure the terminal receiver frequency responses, for each of the transmit antennas at the hub, over the allocated channel bandwidth. A distinct subset of OFDM sub-carriers are assigned to each of the transmit antennas. The assignment can be performed on a frame by frame basis. Each terminal feeds back the measured response data corresponding to each transmit antenna to the hub. The hub then applies an optimal transmission parameter set and transmit antenna subset for the data portion of the OFDM frame to each terminal. This approach advantageously permits the hub to independently optimize the transmission quality to each terminal. For example, with knowledge of the channel response, the hub can utilize transmit power more efficiently based on the minimum required power at each terminal or can upgrade the transmission rates. Further, the above arrangement advantageously permits use of simple, inexpensive terminals, while maximizing use of diversity.

According to one aspect of an embodiment of the present invention, a method for supporting transmission in a multi-input-multi-output (MIMO) communication system including a plurality of terminals is disclosed. The method includes transmitting a preamble portion of a frame from a plurality of antennas to the terminals over a channel, wherein each of the terminals determines a characteristic of the channel with respect to the antennas as feedback information. The method also includes receiving the feedback information from the terminals. The method further includes selecting, according to the feedback information, a subset of the antennas among a plurality of antennas for transmission of a remaining portion of the frame to the terminals.

According to another aspect of an embodiment of the present invention, a hub device for supporting transmission in a multi-input-multi-output (MIMO) communication system including a plurality of terminals is disclosed. The device includes means for transmitting a preamble portion of a frame from a plurality of antennas to the terminals over a channel, wherein each of the terminals determines a characteristic of the channel with respect to the antennas as feedback information. The device also includes means for receiving the feedback information from the terminals. Further, the device includes a processor configured to select, according to the feedback information, a subset of the antennas among a plurality of antennas for transmission of a remaining portion of the frame to the terminals.

According to another aspect of an embodiment of the present invention, a method for communicating in a multi-input-multi-output (MIMO) communication system including a hub is disclosed. The method includes receiving a preamble portion of a frame from a plurality of antennas of the hub over a channel; and determining a characteristic of the channel with respect to the antennas as feedback information. The method also includes transmitting the feedback information to the hub, wherein the hub selects, according to the feedback information, a subset of the antennas among a plurality of antennas of the hub for transmission of a remaining portion of the frame.

According to another aspect of an embodiment of the present invention, a terminal device for communicating in a multi-input-multi-output (MIMO) communication system including a hub is disclosed. The device includes means for receiving a preamble portion of a frame from a plurality of antennas of the hub over a channel; means for determining a characteristic of the channel with respect to the antennas as feedback information; and means for transmitting the feedback information to the hub. The hub selects, according to the feedback information, a subset of the antennas among a plurality of antennas of the hub for transmission of a remaining portion of the frame.

According to another aspect of an embodiment of the present invention, a method for distributing audio/video information in a point-to-multipoint multiple access system including a hub communicating with a plurality of terminals is disclosed. The method includes generating a preamble symbol according to an Orthogonal Frequency Division Multiplexing (OFDM) scheme, wherein all OFDM sub-carriers are divided uniformly into a plurality of sub-carrier sets. The sub-carrier sets are assigned to a respective plurality of antennas of the hub. The method also includes transmitting the preamble symbol, based on the sub-carrier set assignment, to the terminals for determination of channel response by the respective terminals to provide feedback information to the hub. Further, the method includes receiving the feedback information from the terminals; and mapping data symbols associated with the preamble symbol to one or more of the antennas, according to the feedback information, for transmission to the terminals.

According to yet another aspect of an embodiment of the present invention, a point-to-multipoint multiple access system for distributing audio/video information is disclosed. The system includes a hub configured to generate a preamble symbol according to an Orthogonal Frequency Division Multiplexing (OFDM) scheme, wherein all OFDM sub-carriers are divided uniformly into a plurality of sub-carrier sets. The sub-carrier sets are assigned to a respective plurality of antennas of the hub. The system also includes a plurality of terminals communicating with the hub, wherein the hub transmits the preamble symbol, based on the sub-carrier set assignment, to the terminals for determination of channel response by the respective terminals to provide feedback information to the hub. The hub is further configured to map data symbols associated with the preamble symbol to one or more of the antennas, according to the feedback information, for transmission to the terminals.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system and method for providing multi-input-multi-output (MIMO) transmission are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to home distribution of audio/video signals, it is recognized that the approach can be utilized in a variety of wireless applications, and premises.

Figure 1:
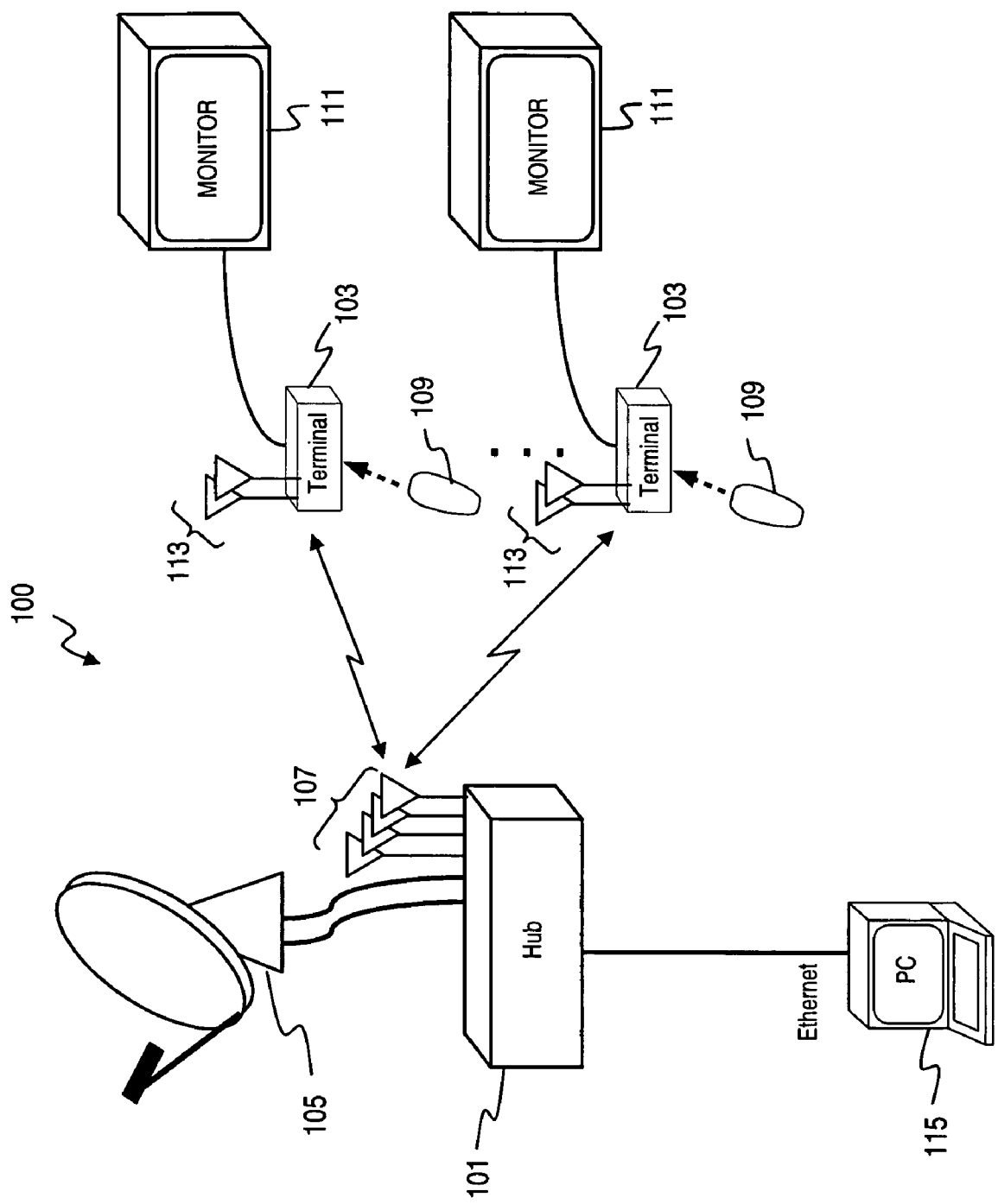
FIG. 1 is a diagram of a Multi-Input-Multi-Output (MIMO) wireless distribution system, according to an embodiment of the present invention.

FIG. 1 is a diagram of a Multi-Input-Multi-Output (MIMO) wireless distribution system, according to an embodiment of the present invention. A distribution system 100, for the purposes of explanation, supports wireless distribution of digital audio/video broadcasts and/or broadband services (e.g., access to the global Internet) from a central hub 101 to one or more terminals 103. For home wireless applications, in particular, distribution of high data rates, such as High Definition Television (HDTV) video signals or picture-in-picture to multiple terminals, from the central hub 101, the deployment of simple, low cost terminals are important to maintain a reasonable cost to the users. To achieve cost effectiveness, it is also important for the hub 101 to utilize transmit power efficiently in communicating with the terminals as to permit use of low power transmitters.

The hub 101 utilizes a transmission scheme that provides maximum diversity gain to the terminals 103 independently of the other, thereby optimizing the link performance for each terminal 103 by perturbing transmission parameters to the particular terminal 103, as more fully described later. Advantageously, the performance gain can be used to optimize the power used at the hub and/or to upgrade the transmission rate. Although the system 100 is described with respect residential indoor wireless applications, it is contemplated that the system 100 has applicability to any short range point-to-multipoint applications in non-line of sight (NLOS) environments.

In the exemplary scenario of FIG. 1, a direct broadcast satellite (DBS) system can serve a household subscriber with many services, ranging from vast television programming to streaming of audio, as well as data services. Each household subscribing to the system receives the broadcast signals through a satellite dish receiver antenna 105. The information for broadcast is ultimately directed to the satellite's coverage area utilizing, for example, the Ku-band, wherein each subscriber within the coverage area can receive the broadcast programming.

The satellite antenna 105 typically includes a parabolic dish and a low noise block (LNB) (not shown), and is mounted outside the house. The LNB amplifies, filters and shifts the incoming signal to an intermediate frequency band, such as L-band (between about 1.0 GHz and 2.0 GHz). The antenna, in an exemplary embodiment, is linked to the hub 101 via coaxial cables. The LNB Inter-facility link (IFL) coaxial cables are routed to the hub 101 without the use of an external multiswitch, thus offering better radio frequency (RF) performance. It recognized that the wireless distribution system 100 can alternatively be implemented with a terrestrial broadcast system (e.g., cable television (CATV)).

In this exemplary configuration, a satellite signal is received by an antenna 105, and forwarded to the hub (or gateway) 101, which in turn wirelessly distributes the received signal using multiple (e.g., four) transmit antennas 107 to one or more terminals 103. The terminals 103 possess traditional set-top box functions for one or more independent viewing locations; e.g., family room, bedroom, home theater room, etc. The user interacts with the terminals 103 using, for instance, an infrared remote control 109, for selecting the particular channel (or data stream) for display on monitors 111. The terminals 103, in an exemplary embodiment, receive the signal over multiple antennas 113. Given the typical location of the hub 101 in relation to the terminals 103, NLOS propagation conditions exist, including severe fading and shadowing problems.

For the MIMO system 100, multiple transmit antennas 107 and receive antennas 113 are used to provide a multiplicity of independently faded paths between the transmit antennas 107 and receive antennas 113, thereby supporting full use of spatial diversity. This arrangement is particularly helpful in the quasi-stationary scenario of FIG. 1; that is, the terminals 103 are effectively mobile units, albeit seldom moved once situated.

The home environment of FIG. 1 can be modeled, as a slow Rayleigh fading environment, whereby switching diversity is provided at the transmitter, i.e., hub 101, to minimize terminal cost. Thus, the hub 101 utilizes several antenna elements 107, which, in an exemplary embodiment, are spaced at least ½ wave-lengths (typically one wavelength), whereby a subset of the antennas 107 are activated at any given time. As detailed below, the hub 101 selects the "best" subset of the antennas 107 based on feedback of the channel response obtained from the terminals 103. Deriving feedback information from the hub-to-terminal signal can be achieved by transmitting known orthogonal signals (e.g., OFDM) from each of the antennas 107 by using an OFDM preamble to determine transmission quality.

In addition to the support of high speed audio/video transmissions, the hub 101 can also deliver broadband services. That is, the hub 101 can interface with a computer, such as a personal computer 115, to access to the global Internet (not shown) over the satellite network.

The above arrangement provides a cost-effective home distribution system, which advantageously simplifies setup and maintenance because of the wireless nature of the communication.

Figure 2:
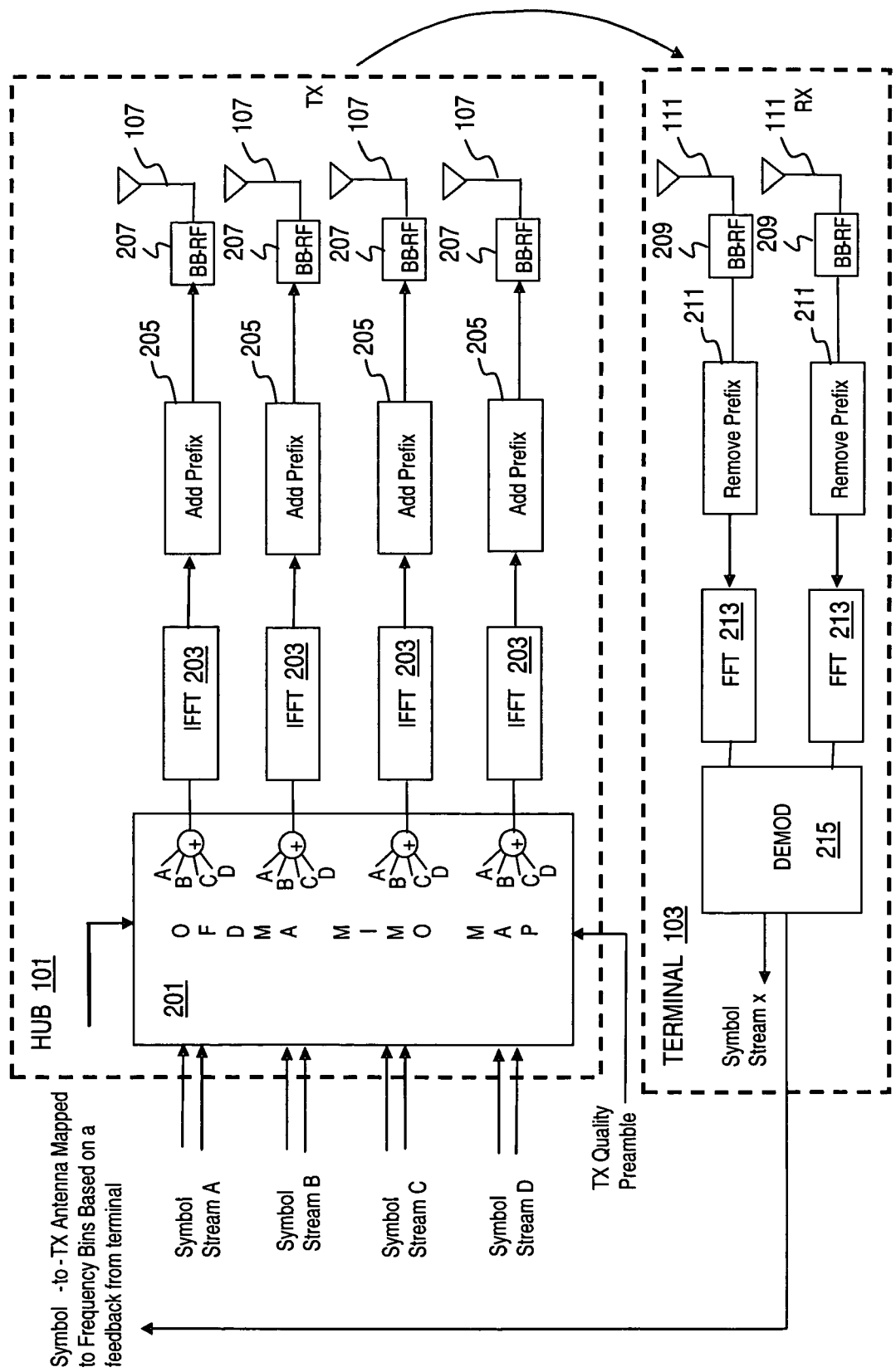
FIG. 2 is a diagram of the hub and terminals used in the system of FIG. 1, according to an embodiment of the present invention.

FIG. 2 is a diagram of the hub and terminals used in the system of FIG. 1, according to an embodiment of the present invention. As seen in FIG. 2, the hub 101 includes an OFDM MIMO multiple access processor (MAP) 201 for selecting the particular set of antennas 107 (in this example, four antennas are present) that are to be activated according to the channel response provided by the terminals 103. In an exemplary embodiment, at the input of the MAP 201, a pair of channel symbol streams are supplied, wherein each pair is destined to a separately located receiver terminals 103 (denoted in this example as A, B, C and D), of which one receiver terminal is shown. The symbol stream pair, which is destined to each terminal 103, is transmitted from the best two (of four) transmit antennas 107 and received by two antennas 111 of the terminal 103; this configuration represents a 2×2 MIMO system, but with higher diversity gain. The choice of which antenna set (or pair in this specific case) to transmit from depends on the feedback from the terminals 103.

Figure 3:
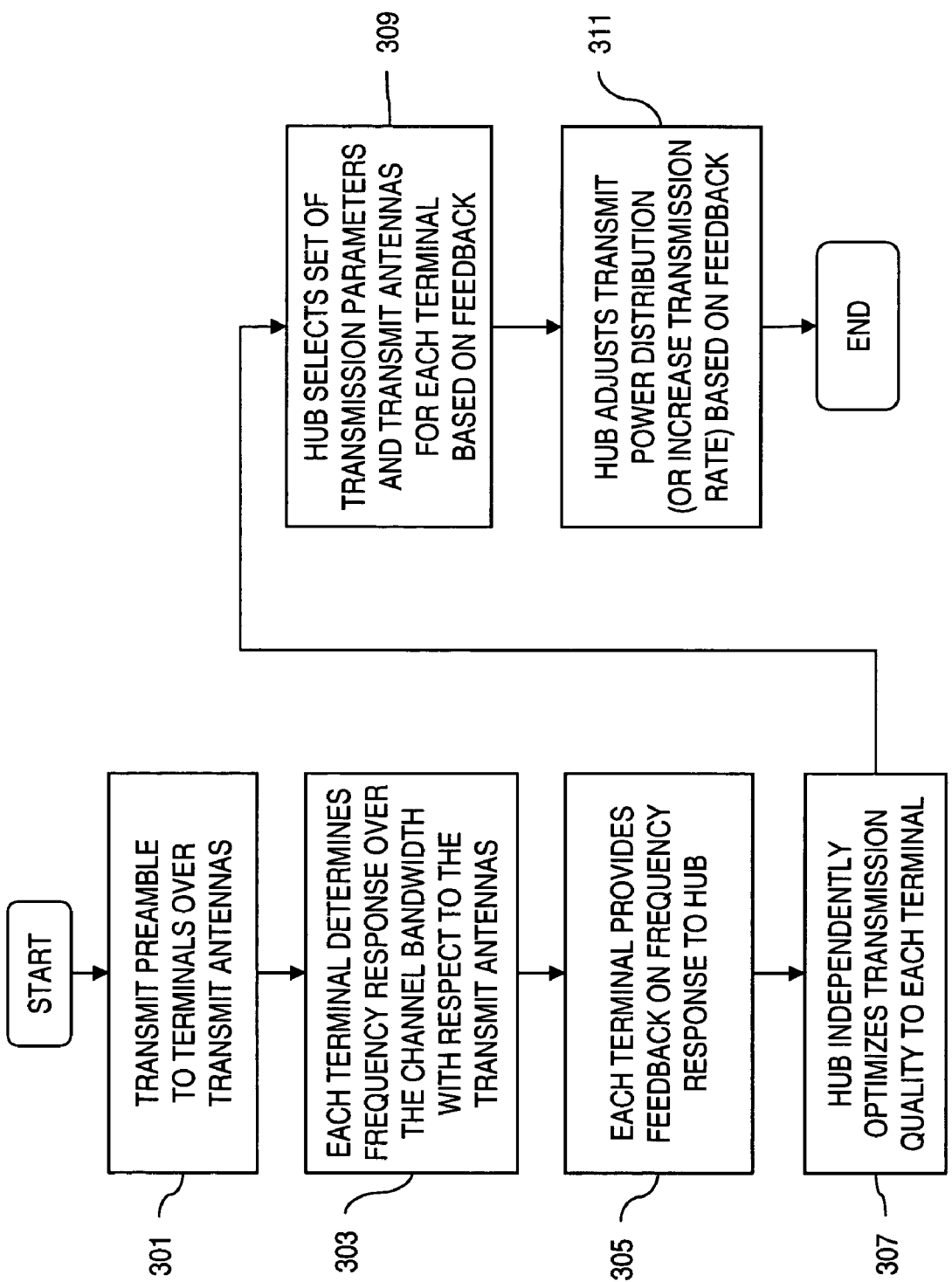
FIG. 3 is a flowchart of a process for determining transmission quality for selection of transmit antennas within a hub, according to an embodiment of the present invention.

The OFDM MAP 201 routes the complex modulation symbols to Inverse Fast Fourier Transform (IFFT) modules 203 of the two best antennas 107, based on the feedback received from the destined terminal 103, as described in FIG. 3. The OFDM symbols undergo the IFFT operation to form a time domain signal. Before transmission, a prefix is added by a Prefix module 205 to mitigate the effects of inter-symbol-interference (ISI) and inter-channel-interference (ICI) introduced by the multi-path channel. The use of this prefix is a standard technique in OFDM systems, and thus, is not further explained herein. Thereafter the OFDM symbol with the prefix is forwarded to a baseband-radio frequency (BB-RF) interface 207, which couples to the antenna 107 for transmission the OFDM signal to the terminal 103.

The terminal 103 receives the transmitted signal from the hub 101 using two receive antennas 111. The signal is fed, along the corresponding receive paths, to baseband-radio frequency (BB-RF) interfaces 209 and then to Remove Prefix modules 211 for removal of the prefix. The received symbol then undergoes a Fast Fourier Transform (FFT) operation via FFT module 213. Next, the received signal is demodulated by a Demodulator 215.

The terminal 103, after performing FFT, sends the measurements of each frequency-bin (sub-carrier receiver data) back to the hub 101. The channel bandwidth frequency responses, from each transmit antenna 107 are naturally and conveniently derived from FFT of the preamble portion in the transmitted OFDM signal, at each of the receive terminals 103.

The hub 101 has knowledge of the frequency set assigned to each transmit antenna 107, and hence, the hub 101 can determine, for each terminal A, B, C, and D, the receiver frequency response corresponding to each of the four transmit antennas 107. This feedback information is then used to route the data portion associated with the transmitted preamble to the two best transmit antennas 107. In other words, based on the feedback, the hub 101 selects a distinct set of transmission parameters and a transmit antenna subset, on an individual basis, for each of the terminal 103 as to provide the best transmission quality for the particular receiver.

When the fading is flat, i.e., frequency non-selective over the allocated channel bandwidth, the estimate for the best transmit antenna set is simply the power received from each of the transmit antenna. However, in a MIMO, frequency selective channel, in particular for OFDM modulation, the knowledge of frequency responses of the channel for each of the transmit to receive path is the optimal set of information; this is so because modulation level and coding can be made to adapt to the signal-to-noise ratio on an OFDM sub-carrier basis. Further, Singular Value Decomposition (SVD) can be implemented in the downlink with this knowledge. Moreover, the frequency response can be readily determined at the output of the FFT frequency bin, without any advanced signal processing and associated delay (such as would be required by an equalizer in a Time Division Multiple Access (TDMA) system).

This efficiently derived frequency response can serve to support adaptive modulation, power balancing and other transmit parameter perturbations—such as used in SVD with spatial multiplexing (space time coding) to enhance the overall performance of the MIMO system 100. According to one embodiment of the present invention, in the preamble portion, logic 1's are transmitted as un-modulated, frequency domain mutually orthogonal sub-carriers of OFDM from the four transmit antennas 107. It is not necessary to transmit the same frequency set in the preamble of every frame. That is, a different frequency set can be transmitted on a frame by frame basis, thereby allowing for a finer frequency resolution in the frequency response measurement.

In the system 100, a diversity order approaching L=8 can be achieved with only two antennas at the downlink terminal 103 and four antennas at the hub 101, whereby, in an exemplary embodiment, only two "best" (of four) transmit antennas 107 are utilized according to predetermined criteria. For example, "best" in one simple case can be determined by signal strength—i.e., a signal arrival at the receiver with strongest energy. Other criteria can include phase adjustments, for instance. Further, power can be shared more efficiently among the terminals 103, and other transmission parameters (e.g., adaptive modulation, phase compensations for induced fast fading, Singular Value Decomposition (SVD), beam forming, etc.) can be set independently for each user for performance enhancement.

Generally, transmitting a pair of symbol streams by two transmit antennas 107 at the hub 101, and using two receive antennas 111 on each terminal 103 yields a 2×2 MIMO, point-to-multipoint multiple access system. For example, this could be a basic 2×2 downlink based on Alamouti's approach, or a 2×2 space time code. The Alamouti approach is more fully described in an article entitled, "A Simple Transmit Diversity Technique for Wireless Communications," IEEE JSAC, Vol. 16, No. 8, pp. 1451-1458, 1998, which is incorporated herein by reference in its entirety. For the same information, the symbol stream contents can be different, but they can still be grouped as a pair for each terminal 103. In OFDM, the symbols modulate the sub-carriers of the OFDM signal.

As noted, the hub 101 can adjust transmit power distribution and/or transmission rate to the terminals 103 based on the feedback information. Accordingly, the data portion of the downlink OFDM signal is used by the hub 101 for multiple downlink access, by assigning the transmit symbols for each terminal 103 a distinct subset of OFDM sub-carriers.

As evident from the above discussion, the feedback mechanism of the system 100 permits the hub 101 to optimize channel performance (i.e., quality of service (QOS) to each receiver independently), thereby providing a significant advantage in NLOS environment for optimal use of transmit power in a multiple access scenario.

FIG. 3 is a flowchart of a process for determining transmission quality for selection of transmit antennas within a hub, according to an embodiment of the present invention. As mentioned previously, the hub 101 employs a preamble portion of the OFDM signal (or frame) to permit measurement of the transmitter to receiver frequency responses over the channel bandwidth for each of the N hub transmit antennas 107 (in the example of FIG. 2, N=4). The hub 101 then utilizes this information to transmit the data portion of the OFDM frame for each terminal 103, independently, by setting optimal transmission parameters and selecting one, two, three or all four transmit antennas 107, as determined based on feedback provided by each of the terminal 103.

In step 301, the OFDM downlink preamble portion is transmitted for measurement of the terminal frequency responses, for each of the transmit antenna 107 at the hub 101, over the allocated channel bandwidth. As mentioned earlier, this is accomplished by transmitting a distinct subset of OFDM sub-carriers on each of the transmit antennas 107. In step 303, each of the terminals 103 determines the frequency response of the channel, and provides feedback on the measured response data corresponding to each transmit antenna 107 (per step 305) to the hub 101.

Based on the feedback information, the hub 101 independently optimizes, as in step 307, the transmission quality to each terminal 103 by determining the best transmission parameter set and transmit antenna subset. In step 309, the hub 101 selects the best transmission parameter set and transmit antenna subset for the data portion of OFDM transmission to each terminal 103. The hub 101 also utilizes feedback information to adjust for a more efficient transmit power distribution based on the minimum required power at each terminal 103, and/or increase the transmission rates for higher throughput (step 311).

Figure 4:
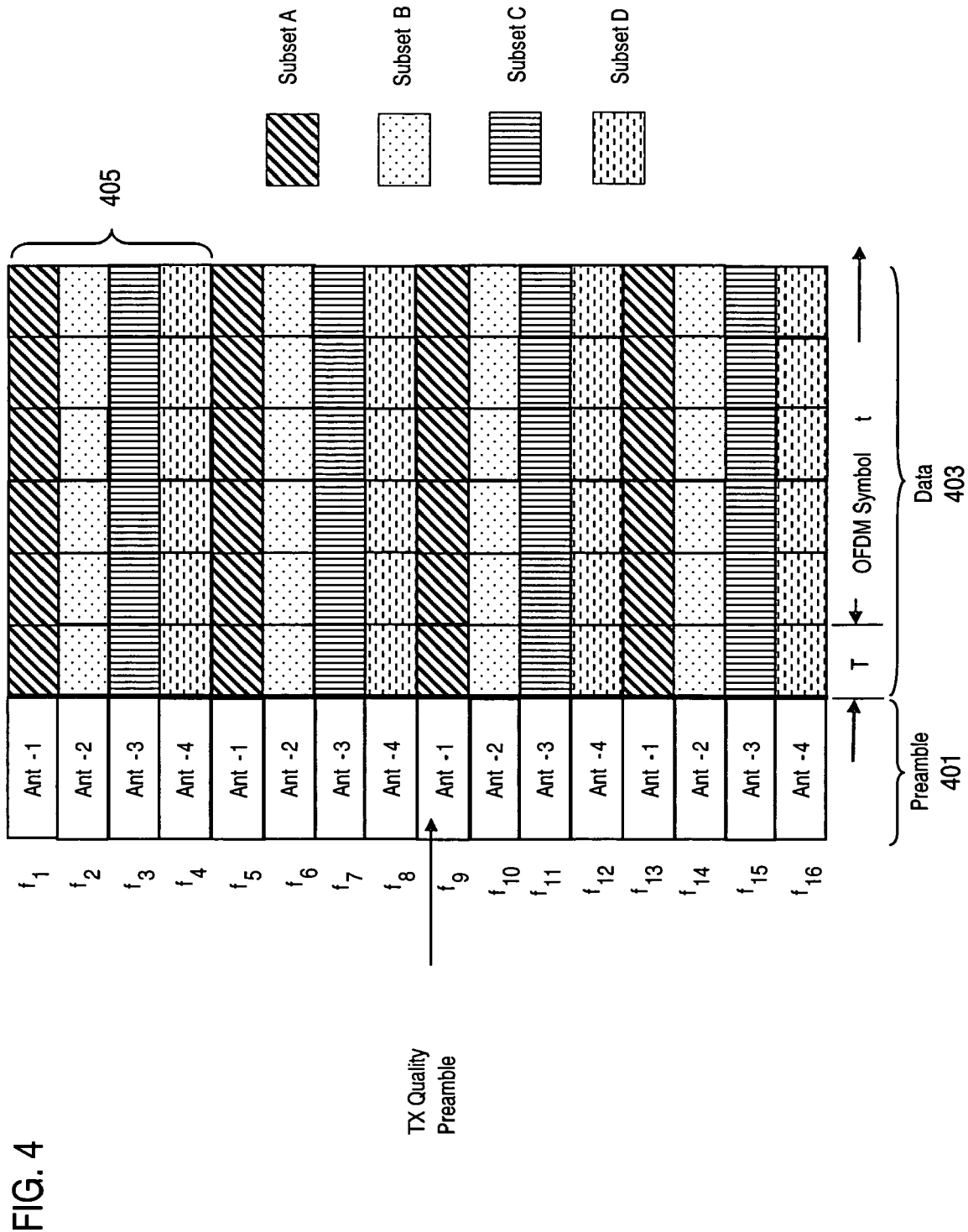
FIG. 4 is an exemplary Orthogonal Frequency Division Multiplexing (OFDM) frame employed in the system of FIG. 1.

FIG. 4 is an exemplary Orthogonal Frequency Division Multiplexing (OFDM) frame employed in the system of FIG. 1. An OFDM-A (OFDM for Multiple Access) symbol set and partitioning, in an exemplary embodiment, for four data streams. The symbol set includes a preamble portion 401 and a data portion 403. In this example, sixteen sub-carriers are utilized. Before the data portion transmission, the preamble OFDM symbol (or symbols) 401 is transmitted. The entire OFDM sub-carrier set is divided, one per transmit antenna 107, into four uniformly distributed subsets. This is shown in the first set 405 of boxes in FIG. 4. Each set is then transmitted at equal power from a specific transmit antenna 107. It is noted that the carriers may or may not be modulated. The carrier subset-transmit antenna assignment is known by the hub 101.

As an example, if the sub-carrier spacing is 0.3125 MHz as in IEEE (Institute of Electrical and Electronics Engineers) 802.11a standard, then each transmit antenna has a sub-carrier resolution of 1.25 MHz. For home application, this carrier resolution is adequate to predict the true transmit-receive channel frequency response by interpolation for each transmit antenna. However, as noted early, the same frequency set need not be used in the preamble of every frame. The frequency set can change from frame to frame. For example, with four TX antennas, all of OFDM sub-carriers can be transmitted from each antenna over four frames, using a different set in each frame.

Typically, in one OFDM symbol duration of T seconds, a set of 16 complex baseband symbols are brought to the input of the IFFT module 203 (shown in FIG. 2). These symbols represent the modulation information for the 16 associated sub-carriers during the time interval T. After the IFFT module 203, the set of modulated sub-carriers f1-f16 represents one OFDM symbol by definition. For multiple access of four as in this example, the OFDM-A sub-carrier set is divided into four subsets, each subset (e.g., A, B, C, and D) serving a distinct downlink terminal 103.

Figure 5:
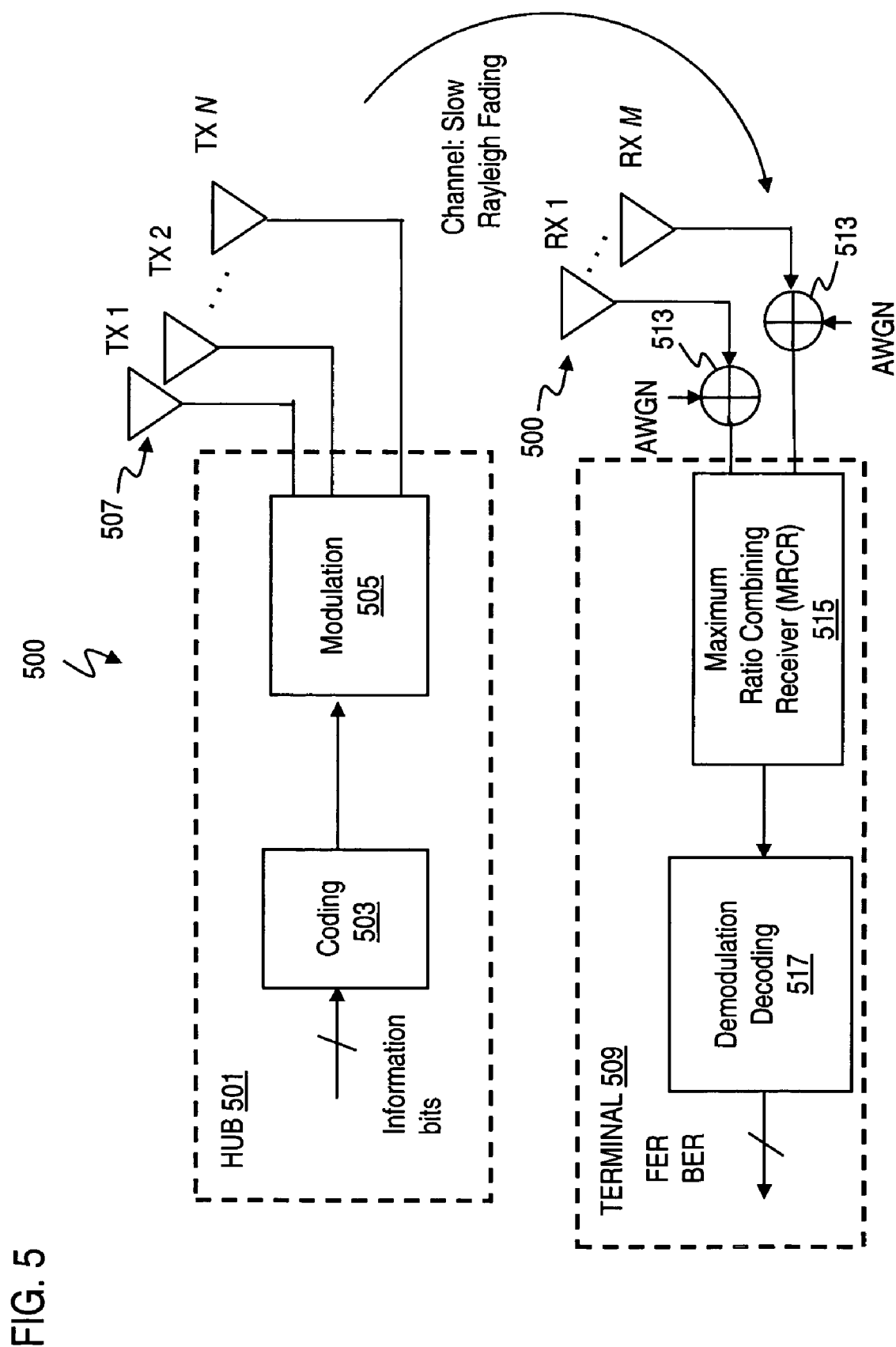
FIG. 5 is a diagram of a simplified MIMO system simulating the system of FIG. 1.

FIG. 5 is a diagram of a simplified MIMO system simulating the system of FIG. 1. A simplified MIMO system 500 (e.g., details such as interleaver/de-interleaver are not provided) is shown for the purposes of interpreting the simulation results of FIGS. 6 and 7. A hub 501 includes a coding module 503 and a modulation module 505, and employs N transmit antennas 507. At a terminal 509, M receive antennas 511 are utilized; thus, the system 500 provides a maximal diversity of MN. The simulation also assumes introduction of Additive White Gaussian Noise (AWGN) 513 by the noisy channel. The terminal 509 further includes a Maximum Ratio Combining Receiver (MRCR) 515 coupling a demodulation/decoding module 517. Additionally, the simulation assumes a single frequency channel. It is noted, however, there is no loss in assuming this simulation to represent each sub-carrier of an OFDM signal.

Figure 6:
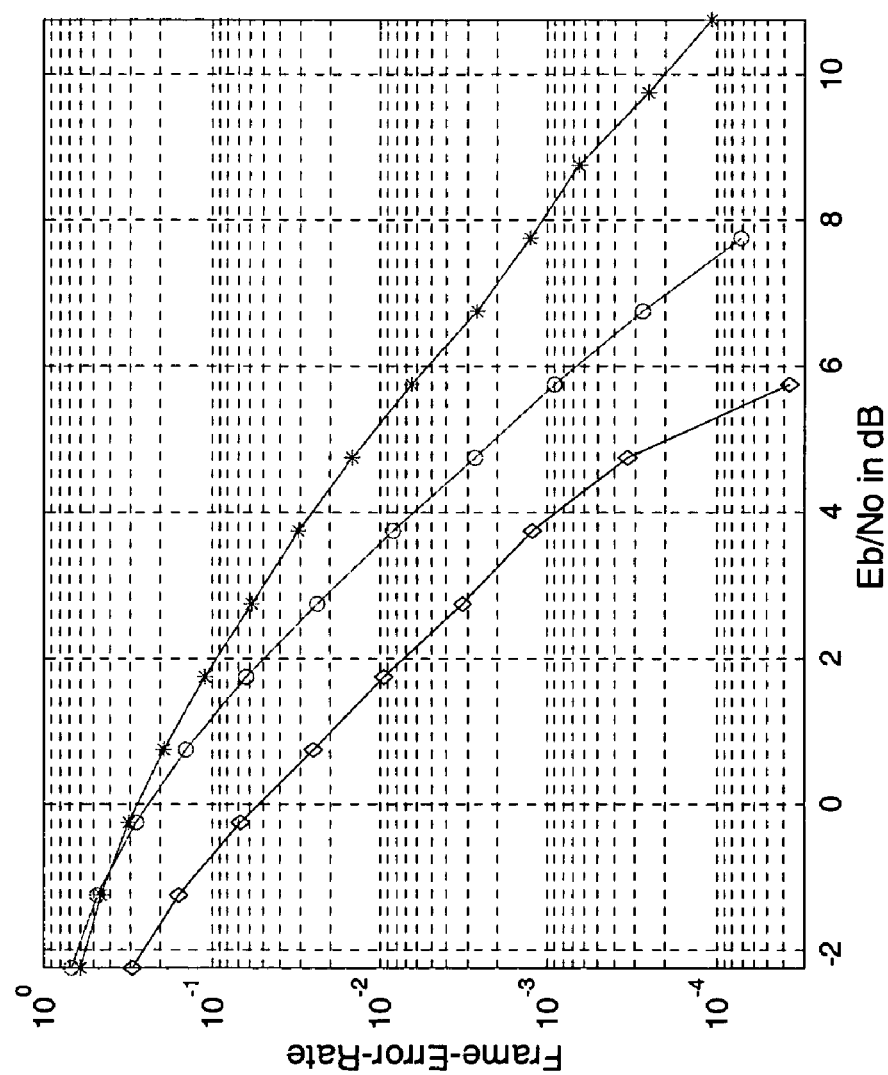
FIGS. 6 and 7 are graphs of the performance of the MIMO system of FIG. 1 for Quadrature Phase Shift Keying (QPSK) modulation and 8 PSK (Phase Shift Keying) modulation, respectively.
Figure 7:
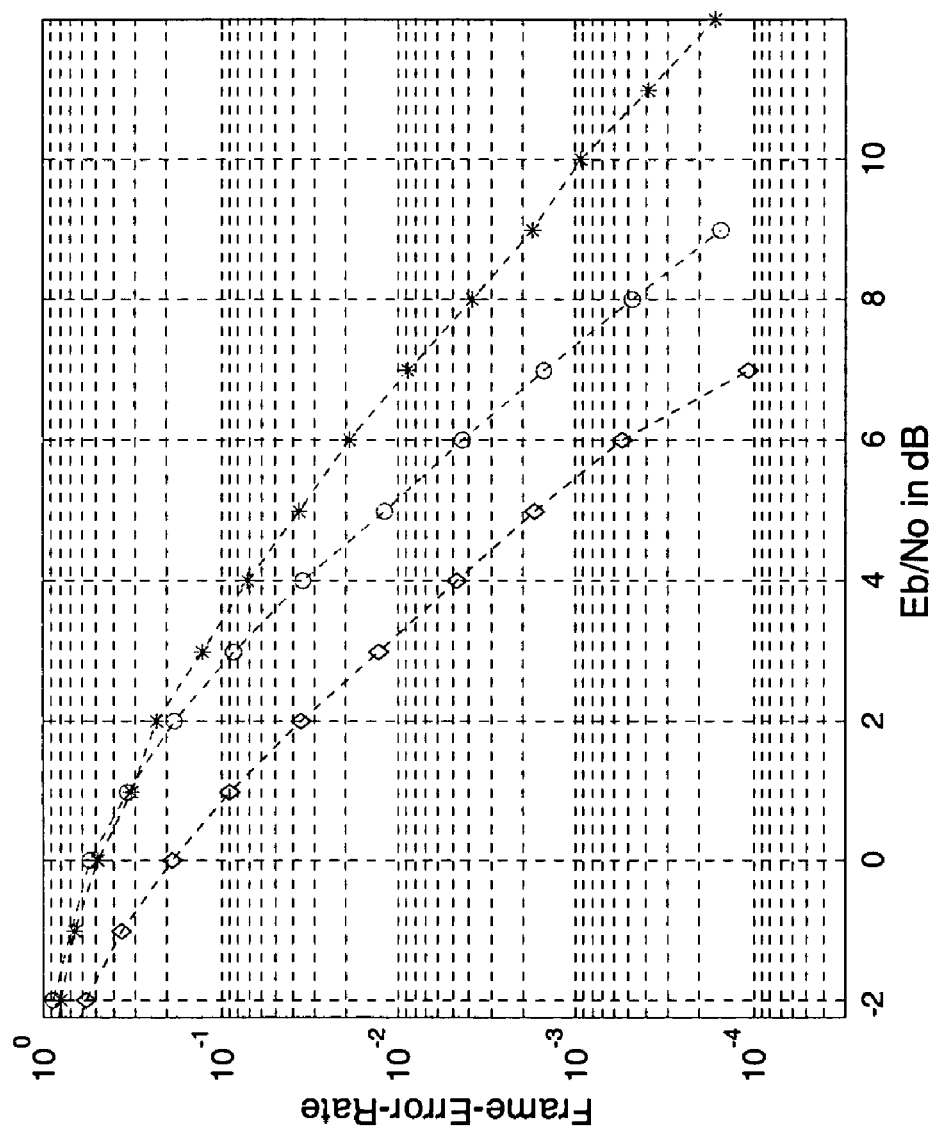

FIGS. 6 and 7 are graphs of the performance of the MIMO system of FIG. 1 for QPSK modulation and 8 PSK modulation, respectively. As stated, the simulation results stem from the system of FIG. 5. The MIMO system utilizes 4 transmit (TX) antennas and 2 receive (RX) antennas, rate 2/3 Forward Error Correction (FEC) code, and Viterbi decoding, as well as Quadrature Phase Shift Keying (QPSK) or 8 PSK (Phase Shift Keying) modulation with a frame length of 128 bits. These parameter are illustrative in nature to show that diversity enhancement can be achieved using Low Density Parity Check (LDPC) codes, Turbo codes, etc.

By way of example, a simple example is described to show the benefit of the diversity selection approach according to the present invention. In a 4 TX antennas and 1 RX antenna configuration, it is assumed that the limitation on total transmit power is 4 Watt. Also, for a particular moment, the following assumption is made: the fading (linear scale) for each path is 0.9, 0.04, 0.001 and 0.0004 and will stay the same during the period of a frame. If the TX power is evenly distributed (e.g., 1 Watt each) among the 4 TX, then the power picked up by the single RX antenna from the 4 TX antenna is 0.9, 0.04, 0.001 and 0.0004 Watt, respectively—ignoring all other attenuations.

Under the diversity selection approach of the present invention, 2 TX antennas with least fading are used to transmit the signal. The transmit power for each TX antenna is 2 Watt and the power at the RX antenna, ignoring all other attenuations, is 1.8 and 0.08 Watt. In an extreme scenario, if only the best TX antenna is selected and is provided with all of the 4-Watt power, the RX antenna can pick up 3.6 Watt. It is noted that more signal power received yields better system performance in terms of bit-error-rate (BER) or frame-error-rate (FER). Thus, the above example shows the efficiency of the diversity selection approach Under an independent Rayleigh fading scenario for each of the 4 TX antennas, the simulation yields the following results. The well-known Alamouti's scheme (2 TX and 2 RX) is simulated as the bench mark. The Alamouti's scheme is believed to provide the maximal diversity with maximal ratio combining receiver. The simulation results on the following three system structures are given under QPSK (FIG. 6) and 8 PSK (FIG. 7).

The reference Alamouti's scheme 2 TX antennas and 2 RX antennas, the data is labeled with symbol "*". The paired approach (labeled with the symbol "○") utilizes 4 TX antennas and 2 RX antennas, but alternatively use 2 TX antennas as a pair to transmit the modulated signal, thereby providing a time-periodic switching diversity without feedback. In the selection diversity approach with channel feedback of the present invention (labeled as "◇"), employs 4 TX antennas and 2 RX antennas, wherein two TX antennas that experience less fading than the other 2 TX are selected based on the feedback for the channel estimation.

As seen in FIG. 6, in the QPSK modulation case, at a FER of $10^{-3}$ the required $E_{bi}/N_o$ for Alamouti's scheme is 8 dB, the required $E_{bi}/N_o$ for paired scheme is 5.8 dB, and the required $E_{bi}/N_o$ for diversity selection scheme is 3.9 dB. This suggests that by having 4 TX and feedback of the channel estimation, the diversity selection approach can achieve >4 dB improvement in $E_{bi}/N_o$ over the reference Alamouti's approach.

A similar performance trend can be found in FIG. 7 with 8 PSK, where the required $E_{bi}/N_o$ for each system structure are higher than that shown in FIG. 6 because of higher throughput from 8PSK. In this case, a gain of 4.5 dB over the Alamouti's 2×2 approach is achieved.

Therefore, as evident from the simulation results, the MIMO system 100 of FIG. 1 exhibits high performance by permitting the hub 101 to independently optimize the transmission quality to each terminal 103.

Figure 8:
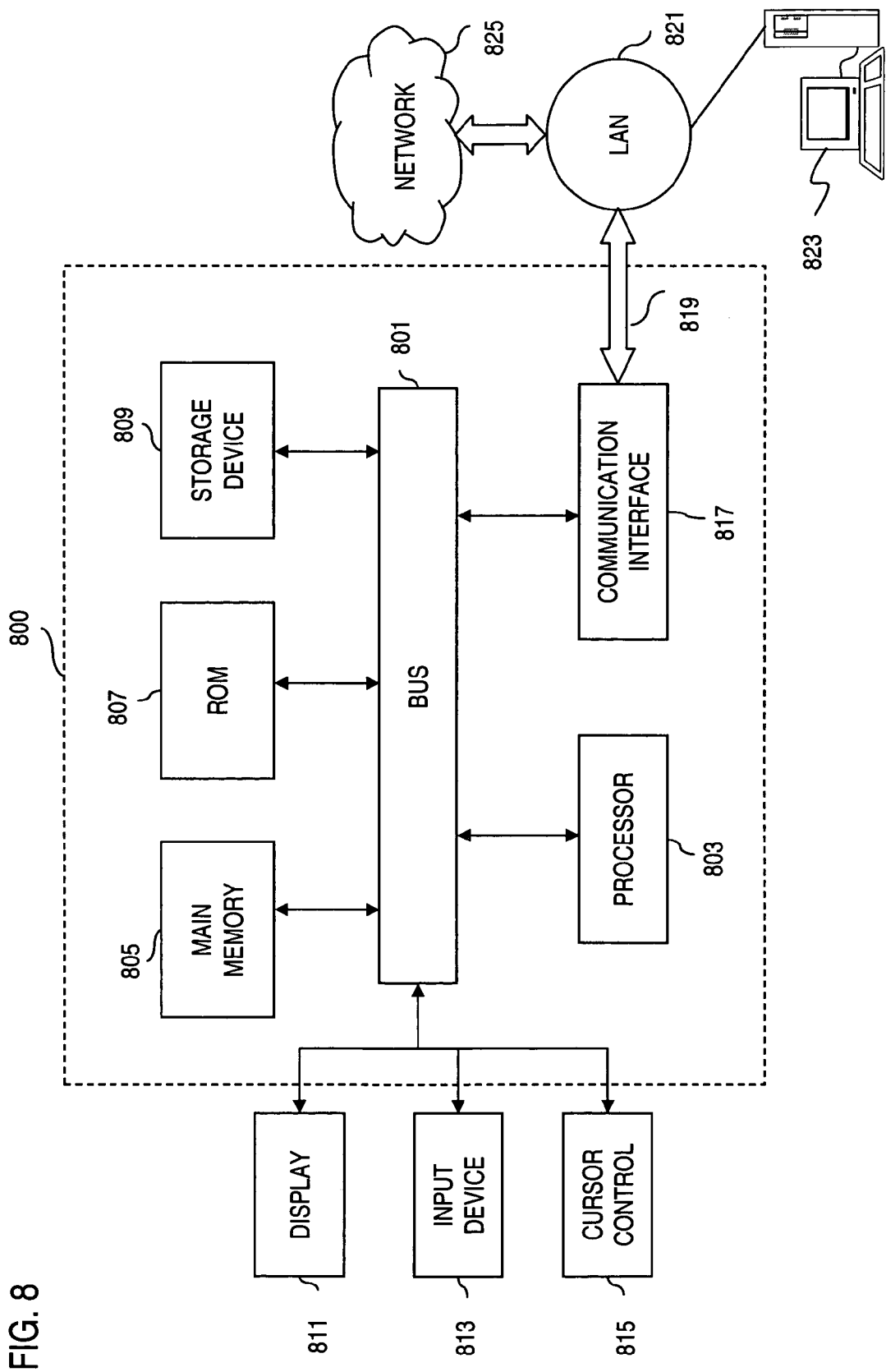
FIG. 8 is a diagram of a computer system that can perform various processes associated with the hub and the terminals of FIG. 1, in accordance with embodiments of the present invention.

FIG. 8 illustrates a computer system upon which an embodiment according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is cursor control 815, such as a mouse, a trackball, or cursor direction keys for communicating direction information and command selections to the processor 803 and for controlling cursor movement on the display 811.

According to one embodiment of the invention, certain functions of the hub 101 is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, or a telephone modem to provide a data communication connection to a corresponding type of telephone line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging to an application program for implementing an embodiment of the present invention through the network 825, local network 821 and communication interface 817. The processor 803 may execute the transmitted code while being received and/or store the code in storage device 89, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the various embodiments of the present invention provide an approach for distributing video from a central hub to multiple access point devices. The approach provides for both uncompressed distribution, as well as compressed distribution of the audio and video signals. The above arrangement advantageously provides a modular, scalable, and cost-effective approach to providing video distribution to multiple television sets.

While the present invention has been described in connection with a number of embodiments and implementations, the present invention is not so limited but covers various obvious modifications and equivalent arrangements, which fall within the purview of the appended claims.

What is claimed is:

1. A method for supporting transmission of audio/video data in a multi-input-multi-output (MIMO) communication system including a plurality of terminals, the method comprising:
   receiving a satellite signal and shifting a frequency of the received signal;
   transmitting a preamble portion of a frame from a plurality of antennas to the terminals over a downlink channel using Orthogonal Frequency Division Multiplexing (OFDM), each of the antennas being assigned a distinct subset of OFDM sub-carriers, wherein each of the terminals determines a characteristic that specifies a complete frequency response of the channel over an entire allocated bandwidth, with respect to the antennas as feedback information;
   receiving the feedback information from the terminals over a return channel that is of a lower transmission rate than the downlink channel; and
   selecting, according to the feedback information for the associated frame, a subset of the antennas for transmission of a remaining portion of the frame to the terminals, wherein at least one of the terminals is not within a line of sight of the subset of antennas.

2. A method according to claim 1, wherein the subset assignment is different from frame to frame.

3. A method according to claim 1, further comprising:
   transmitting the remaining portion of the frame over the subset of antennas, wherein the subset includes two antennas among a total of four antennas.

4. A method according to claim 3, wherein each of the terminals includes two antennas for receiving the frame.

5. A method according to claim 1, further comprising:
   adjusting, based on the feedback information, one of transmission power and transmission rate for transmit-ting the frame.

6. A method according to claim 1, further comprising:
   adjusting, based on the feedback information, transmission power and transmission rate for transmitting the frame.

7. A method according to claim 1, wherein the frame includes a plurality of distinct data streams for receipt by corresponding ones of the terminals.

8. A method according to claim 1, further comprising providing a personal computer with internet access via the satellite signal.

9. A hub device for supporting transmission of audio/video data in a multi-input-multi-output (MIMO) communication system including a plurality of terminals, the device comprising:
   means for receiving a signal from a satellite system;
   means for transmitting a preamble portion of a frame from a plurality of antennas to the terminals over a downlink channel using Orthogonal Frequency Division Multiplexing (OFDM), each of the antennas being assigned a distinct subset of OFDM sub-carriers, wherein each of the terminals determines a characteristic that specifies a complete frequency response of the channel over an entire allocated bandwidth, with respect to the antennas as feedback information;

means for receiving the feedback information from the terminals over a return channel that is of a lower transmission rate than the downlink channel; and a processor configured to select, according to the feedback information for the associated frame, a subset of the antennas among a plurality of antennas for transmission of a remaining portion of the frame to the terminals, wherein at least one of the terminals is not within a line of sight of the subset of antennas.

10. A device according to claim 9, wherein the subset assignment is different from frame to frame.

11. A device according to claim 9, wherein the remaining portion of the frame is transmitted over the subset of antennas, wherein the subset includes two antennas among a total of four antennas.

12. A device according to claim 11, wherein each of the terminals includes two antennas for receiving the frame.

13. A device according to claim 9, further comprising:
means for adjusting, based on the feedback information, one of transmission power and transmission rate for transmitting the frame.

14. A device according to claim 9, further comprising:
means for adjusting, based on the feedback information, transmission power and transmission rate for transmitting the frame.

15. A device according to claim 9, wherein the frame includes a plurality of distinct data streams for receipt by corresponding ones of the terminals.

16. A device according to claim 9, further comprising means for providing a personal computer with data access via the satellite system.

17. A method for distributing audio/video information in a point-to-multipoint multiple access system including a hub communicating with a plurality of terminals, the method comprising:
receiving a satellite signal having a first frequency;
converting the received signal to a second frequency different from the first frequency;
providing a personal computer with internet access via the satellite signal;
generating a preamble symbol according to an Orthogonal Frequency Division Multiplexing (OFDM) scheme, wherein all OFDM sub-carriers are divided uniformly into a plurality of sub-carrier sets, the sub-carrier sets being assigned to a respective plurality of antennas of the hub, wherein the subset assignment is different from frame to frame;
transmitting the preamble symbol over a downlink channel, based on the sub-carrier set assignment, to the terminals for determination of channel response by the respective terminals to provide feedback information to the hub over a return channel that is of a lower transmission rate than the downlink channel, wherein at least one of the terminals is not within a line of sight of the subset of antennas;
receiving the feedback information from the terminals; and
mapping data symbols associated with the preamble symbol to one or more of the antennas, according to the feedback information, for transmission to the terminals.

18. A point-to-multipoint multiple access system for distributing audio/video information, the system comprising:
a hub configured to receive a satellite signal having a first frequency, convert the received signal to a second frequency different from the first frequency, providing a personal computer with internet access via the satellite signal, generate a preamble symbol according to an Orthogonal Frequency Division Multiplexing(OFDM) scheme, wherein all OFDM sub-carriers are divided uniformly into a plurality of sub-carrier sets, the sub-carrier sets being assigned to a respective plurality of antennas of the hub, wherein the subset assignment is different from frame to frame; and
a plurality of terminals communicating with the hub, wherein the hub transmits the preamble symbol over a downlink channel, based on the sub-carrier set assignment, to the terminals for determination of channel response by the respective terminals to provide feedback information to the hub over a return channel that is of a lower transmission rate than the downlink channel, wherein at least one of the terminals is not within a line of sight of the subset of antennas, and
wherein the hub is further configured to map data symbols associated with the preamble symbol to one or more of the antennas, according to the feedback information, for transmission to the terminals.

19. A method for supporting transmission of audio/video data in a multi-input-multi-output (MIMO) communication system including a plurality of terminals, the method comprising:
receiving a satellite signal and shifting a frequency of the received signal;
transmitting a preamble portion of a frame from a plurality of antennas to the terminals over a channel using Orthogonal Frequency Division Multiplexing (OFDM), each of the antennas being assigned a distinct subset of OFDM sub-carriers, wherein the subset assignment is different from frame to frame, and wherein each of the terminals determines a characteristic that specifies a complete frequency response of the channel over an entire allocated bandwidth, with respect to the antennas as feedback information;
receiving the feedback information from the terminals; and
selecting, according to the feedback information for the associated frame, a subset of the antennas for transmission of a remaining portion of the frame to the terminals, wherein at least one of the terminals is not within a line of sight of the subset of antennas.

20. A method according to claim 19, wherein the preamble portion is transmitted over a downlink channel and the feedback information is received over a return channel that is of a lower transmission rate than the downlink channel.

* * * * *